(12) United States Patent
Yang

(10) Patent No.: US 10,443,770 B2
(45) Date of Patent: Oct. 15, 2019

(54) TOOL FOR MOUNTING AND DISMOUNTING PIPE CLAMP

(71) Applicant: Jen-Yung Yang, Taichung (TW)

(72) Inventor: Jen-Yung Yang, Taichung (TW)

( * ) Notice: Subject to any disclaimer, the term of this patent is extended or adjusted under 35 U.S.C. 154(b) by 276 days.

(21) Appl. No.: 15/452,315

(22) Filed: Mar. 7, 2017

(65) Prior Publication Data

US 2018/0259109 A1    Sep. 13, 2018

(51) Int. Cl.
*F16L 33/03* (2006.01)
*B25B 27/20* (2006.01)
*B25B 13/22* (2006.01)

(52) U.S. Cl.
CPC .............. *F16L 33/03* (2013.01); *B25B 13/22* (2013.01); *B25B 27/205* (2013.01)

(58) Field of Classification Search
CPC ........... B25B 13/18; B25B 13/22; B25B 9/00; B25B 9/04; B25B 27/00; B25B 27/205; B25B 27/26; B25B 27/146; B25B 27/20; B25B 25/005
See application file for complete search history.

(56) References Cited

U.S. PATENT DOCUMENTS

| | | | |
|---|---|---|---|
| 1,168,669 A * | 1/1916 | Murdick et al. | B67B 7/18 30/438 |
| 1,408,524 A * | 3/1922 | Long | B25B 13/12 81/357 |
| 1,412,293 A * | 4/1922 | Sewell | B25B 13/18 30/185 |
| 1,478,942 A * | 12/1923 | Cook | B25B 27/12 29/223 |
| 1,546,978 A * | 7/1925 | Golding | B25B 13/18 81/356 |
| 2,369,346 A * | 2/1945 | Gearhart | B25B 13/18 81/356 |
| 2,407,546 A * | 9/1946 | Gearhart | B25B 7/10 81/306 |
| 2,677,982 A * | 5/1954 | Arras | B25B 7/02 24/27 |
| 2,931,258 A * | 4/1960 | Ronning, Jr. | B67B 7/18 81/3.44 |
| 3,013,456 A * | 12/1961 | Ericson | B25B 7/02 81/319 |
| 3,161,086 A * | 12/1964 | Kircher | B25B 25/005 81/426.5 |
| 3,354,755 A * | 11/1967 | Legrande | B25B 5/068 81/314 |

(Continued)

FOREIGN PATENT DOCUMENTS

| | | | | |
|---|---|---|---|---|
| GB | 2539101 A | * | 12/2016 | B25B 27/205 |
| JP | 2015077674 A | * | 4/2015 | B25B 27/20 |

*Primary Examiner* — Tyrone V Hall, Jr.
(74) *Attorney, Agent, or Firm* — Guice Patents PLLC

(57) ABSTRACT

In a tool for mounting and dismounting a pipe clamp provided by the present creation, a first end portion and a movable second end portion are separately disposed on a base, and a connecting rod mechanism is used to convert circular motion into linear motion of the second end portion by force, so as to reduce the distance between the second end portion and the first end portion, thereby achieving an effect that the annular inner diameter of a pipe clamp is increased when the pipe clamp is held between the first end portion and the second end portion.

9 Claims, 6 Drawing Sheets

(56) References Cited

U.S. PATENT DOCUMENTS

| | | | | |
|---|---|---|---|---|
| 3,604,289 A * | 9/1971 | Steel | ............... | B67B 7/162 81/3.42 |
| 4,052,917 A * | 10/1977 | Gee | ............... | B25B 13/20 81/185.1 |
| 4,368,569 A * | 1/1983 | Van Dam, Jr. | ............... | B25B 25/005 29/229 |
| 4,919,017 A * | 4/1990 | Thomas | ............... | B25B 25/005 29/229 |
| 5,125,296 A * | 6/1992 | Nelson | ............... | B25B 25/005 29/229 |
| 5,209,143 A * | 5/1993 | Sweet | ............... | B25B 7/02 29/229 |
| 5,590,573 A * | 1/1997 | Detable | ............... | B25B 25/005 81/423 |
| 6,128,975 A * | 10/2000 | Schley | ............... | B25B 7/12 29/229 |
| 6,164,162 A * | 12/2000 | Furundzic | ............... | B25B 25/005 29/229 |
| D440,842 S * | 4/2001 | Vandergaw | ............... | D8/39 |
| 6,389,930 B1 * | 5/2002 | Gore | ............... | B25B 13/48 81/55 |
| 6,854,361 B2 * | 2/2005 | Vandergaw | ............... | B67B 7/18 81/3.07 |
| 7,040,609 B1 * | 5/2006 | Liou | ............... | B25B 5/068 269/3 |
| 7,966,911 B2 * | 6/2011 | Thayer | ............... | B25B 1/103 29/225 |
| 2003/0033909 A1 * | 2/2003 | Gore | ............... | B25B 13/48 81/9.3 |
| 2004/0183294 A1 * | 9/2004 | Elliott | ............... | B25B 1/205 285/15 |
| 2007/0056407 A1 * | 3/2007 | Thayer | ............... | B25B 1/103 81/9.3 |
| 2007/0227309 A1 * | 10/2007 | Teeters | ............... | B25B 15/02 81/9.3 |
| 2013/0086782 A1 * | 4/2013 | Dewell | ............... | B25B 27/10 29/237 |
| 2013/0228046 A1 * | 9/2013 | Wu | ............... | B25B 7/02 81/9.3 |

* cited by examiner

TOOL FOR MOUNTING AND DISMOUNTING PIPE CLAMP

BACKGROUND OF THE INVENTION

1. Field of the Invention

The present creation relates to a tool, and more particularly to a tool for mounting and dismounting a pipe clamp.

2. Description of the Related Art

To properly fix joint parts of pipelines, a generally used method is to bind and fix the joint parts by using elastic hand-pressing pipe clamps. A large force is required to be applied on a hand-pressing pipe clamp to increase its annular inner diameter for mounting or dismounting. To facilitate the mounting and dismounting operation, several clamp tool technologies of different designs are disclosed in the prior art.

Specifically, as disclosed by a Chinese utility model patent No. M484497 in the prior art, the distance between a movable end and a fixed end is changed through rotation of a threaded rod, so as to change the inner diameter of a hand-pressing pipe clamp to facilitate mounting or dismounting. However, according to the driving manner through rotation of a threaded rod, a long rotation distance is required to achieve a desired moving distance of the movable end, and other tools such as a wrench are needed for assistance, so that it is inconvenient in use.

SUMMARY OF THE INVENTION

Therefore, a main objective of the present creation is to provide a tool for mounting and dismounting a pipe clamp, which is convenient to operate, and can rapidly increase the annular inner diameter of a pipe clamp to facilitate mounting or dismounting without assistance of other tools.

To achieve the above objective, the present creation provides a tool for mounting and dismounting a pipe clamp, and in technical features, a first end portion and a movable second end portion are separately disposed on a base, and a connecting rod mechanism is used to convert circular motion into linear motion of the second end portion by force, so as to reduce the distance between the second end portion and the first end portion, thereby achieving an effect that the annular inner diameter of a pipe clamp is increased when the pipe clamp is held between the first end portion and the second end portion.

Further, in the technical content, the tool for mounting and dismounting a pipe clamp includes a base having a linearly extending guide portion; a first end portion, disposed on the base; a second end portion, disposed on the base, and capable of being guided by the guide portion to make linear reciprocating displacement on the base, so as to be close to or away from the first end portion; and an operating member, for driving the second end portion to make linear reciprocating displacement on the base. The operating member has a connecting portion connected to the second end portion, a pulling portion having one end connected to the connecting portion, and a supporting portion having one end pivotally connected to the pulling portion and the other end abutting against the base so as to be positioned. Thereby, an angle is formed by the abutment part of the other end of the supporting portion and the base, the pivotal connection part of the supporting portion and the pulling portion, and the connection part of the connecting portion and the second end portion. An external force is applied to rotate the pulling portion to change the value of the angle, so that the second end portion is driven by the connecting portion to make reciprocating displacement on the base.

To position the other end of the supporting portion, a plurality of positioning portions is sequentially and separately disposed on the base along an extension straight line of the guide portion, and is used for positioning the other end of the supporting portion.

Further, the positioning portions are holes, in which the other end of the supporting portion may be inserted, and the supporting portion is positioned accordingly.

In addition, to normally position the second end portion on a reset position, a first elastic element is disposed between the supporting portion and the pulling portion, to elastically maintain a first value of the angle, and thus the second end portion is located on the reset position.

When the second end portion is driven by the operating member to be displaced from the reset position to a target position, the angle reaches a second value greater than the first value, and a retaining member disposed on the pulling portion is engaged on the base, to maintain the second value of the angle, so that the second end portion is positioned on the target position.

To avoid unexpected release of the retaining member, a second elastic element is disposed between the retaining member and the pulling portion, to elastically maintain the engagement between the retaining member and the base.

DETAILED DESCRIPTION OF THE PREFERRED EMBODIMENTS

Figure 1:
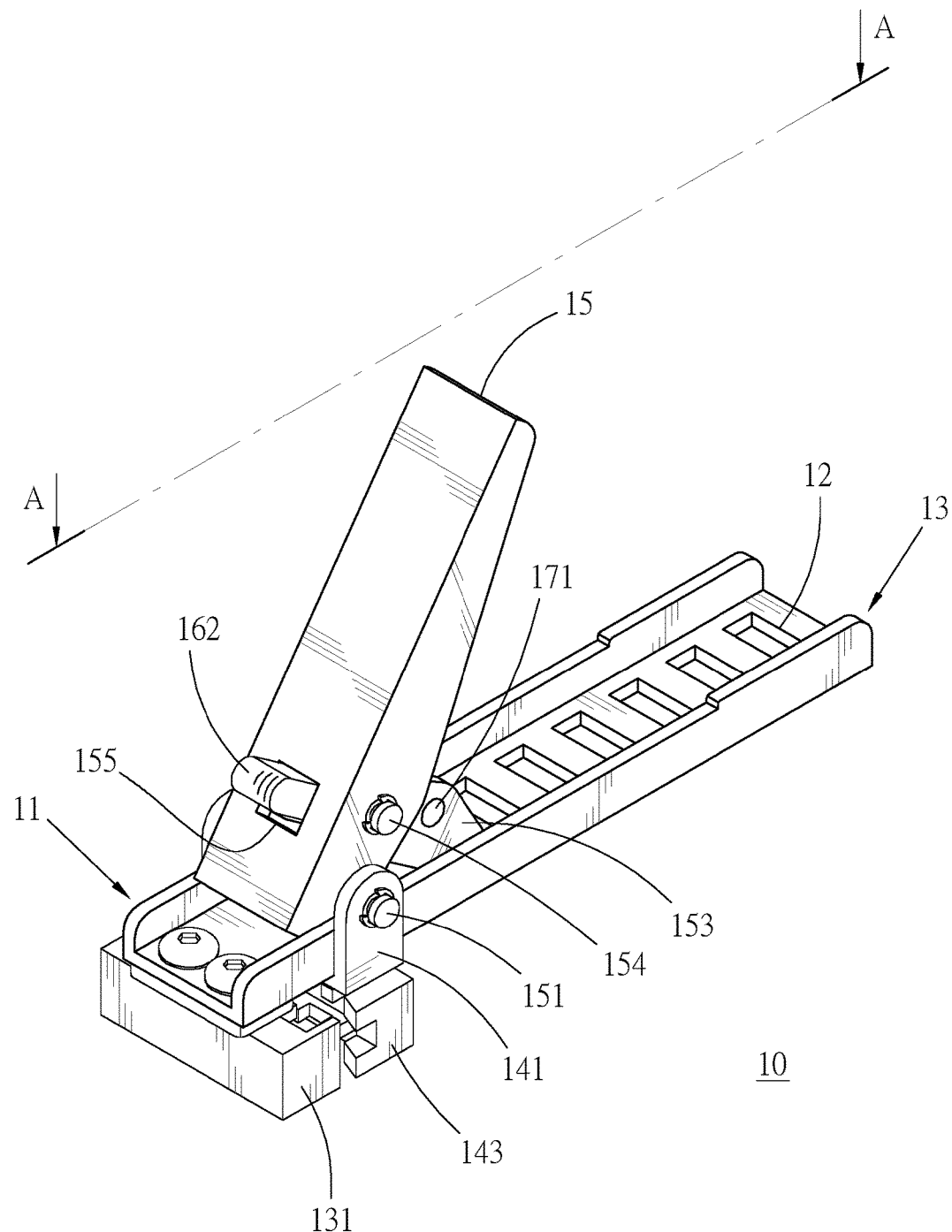
FIG. 1 is a three-dimensional diagram of a preferred embodiment of the present creation.
Figure 2:
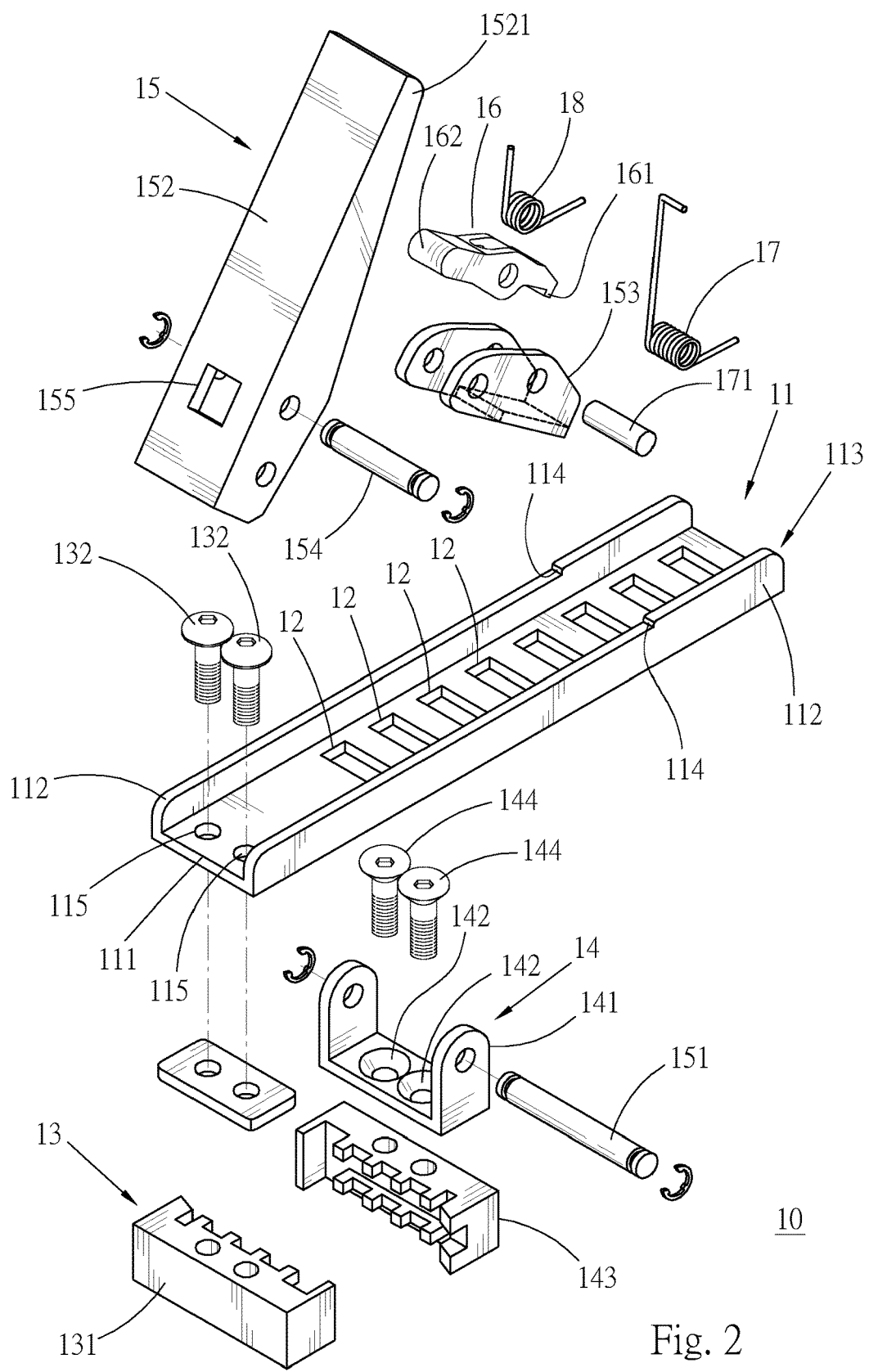
FIG. 2 is an exploded diagram of a preferred embodiment of the present creation.

Firstly, referring to FIG. 1 and FIG. 2, a tool (10) for mounting and dismounting a pipe clamp provided by a preferred embodiment of the present creation mainly includes abase (11), a plurality of positioning portions (12), a first end portion (13), a second end portion (14), an operating member (15), a retaining member (16), a first elastic element (17), and a second elastic element (18).

The base (11) has an approximately rectangular base plate (111). A guide portion (113) formed by two parallel side plates (112) linearly extends along the long axis of the base plate (111), and protrudes from two sides of the long axis of the base plate (111). Two stop shoulder surfaces (114) are separately disposed on the side plates and are perpendicularly corresponding to the long axis of the base plate (111). Two joining holes (115) penetrate in parallel through one end of the long axis of the base plate (111).

The positioning portions (12) are holes respectively penetrating through the base plate (111), and are sequentially arranged at equal distances along the long axis of the base plate (111).

The first end portion (13) has a first end block (131), and is fixed on one end of the long axis of the base plate (111) by means of two first joining bolts (132) penetrating through the joining holes (115).

The second end portion (14) has an approximately U-shaped plate-like slide body (141). The U-shaped inner side surface of the slide body (141) is attached to and slidably disposed on the base plate (111) and the side plates (112), and thus the slide body (141) can slidably move on the base (11) in a reciprocating manner along an extension straight line of the guide portion (113). Two through holes (142) penetrate through a side plate of a closed end of the slide body (141). A second end block (143) is fixed on the slide body (141) by means of two second joining bolts (144) penetrating through the through holes (142), and is disposed opposite to the first end block (131).

The operating member (15) has a rod-shaped connecting portion (151) which is bridged and pivotally connected by two ends between two free ends of the slide body (141), and is laid on a side plate end of the side plates (112), so that the slide body (141) is limited on the base (11) and the connecting portion (151) is movable on the base (11) along with the displacement of the slide body (141). A bar-shaped plate-like pulling portion (152) having a U-shaped section is pivotally connected on the connecting portion (151) through two side bodies (1521) located on one end of the long axis. One end of a supporting portion (153) is pivotally connected between the side bodies (1521) through a shaft bolt (154), and the tip of the other end of the supporting portion (153) extends between the side plates (112) and is inserted in the corresponding positioning portion (12) so as to be positioned. A via hole (155) penetrates through the plate of a U-shaped closed end of the pulling portion (152).

The retaining member (16) is an elongated plate-like body, and is located between the side bodies (1521). The central part of the retaining member (16) is pivotally disposed on the shaft bolt (154), one end (161) of the long axis of the retaining member (16) is located between the pulling portion (152) and the base plate (111), and the other end (162) of the long axis of the retaining member (16) penetrates through the via hole (155) and protrudes from the pulling portion (152) in a direction away from the base (11).

The first elastic element (17) is a torsion spring sleeved on a positioning bolt (171) bridged between the side bodies (1521), and has two ends respectively abutting between the pulling portion (152) and the supporting portion (153), so as to elastically maintain the relative positions between the supporting portion (153) and the pulling portion (152) in a free state.

The second elastic element (18) is a torsion spring coaxially sleeved on the shaft bolt (154), and has two ends respectively abutting between the pulling portion (152) and the retaining member (16), so as to elastically determine the relative positions between one end (162) of the long axis of the retaining member (16) and the pulling portion (152) in a free state.

Figure 3:
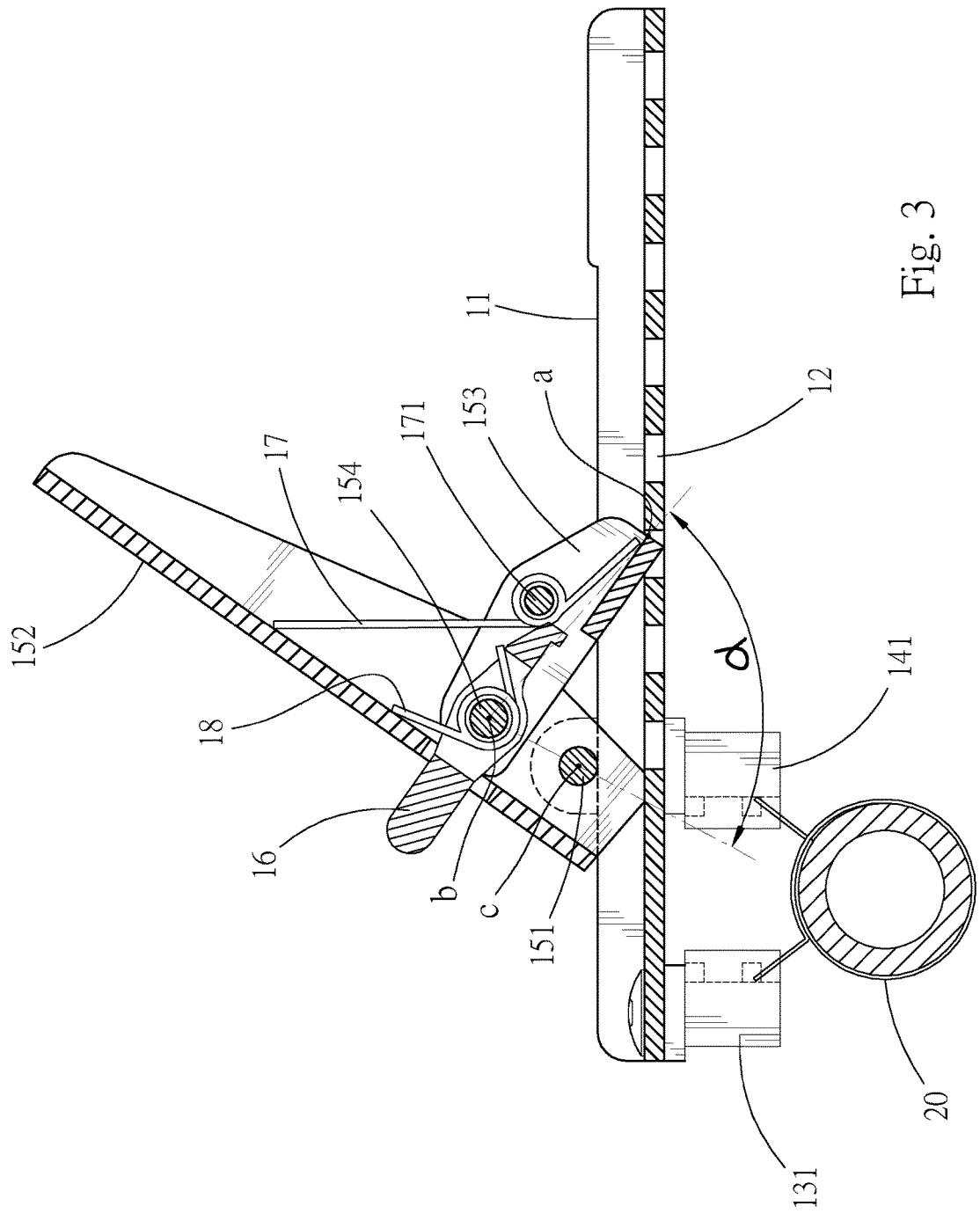
FIG. 3 is a cross-sectional diagram along the section line A-A in FIG. 1 according to a preferred embodiment of the present creation, where the angle is of a first value.

With the constitution of the above members, the use of the tool (10) for mounting and dismounting a pipe clamp is shown in FIG. 3. A user applies a force to make the second end portion (14) move on the base (11), so that a pipe clamp (20) is held between the first end block (131) and the second end block (143), and the other end of the supporting portion (153) is inserted in the corresponding positioning portion (12). In this way, an angle (α) formed by the abutment part (a) of the supporting portion (153) and the base (11), the pivotal connection part (b) of the supporting portion (153) and the pulling portion (152), and the connection part (c) of the connecting portion and the second end portion is elastically maintained at a first value under an elastic force provided by the first elastic element (17).

Figure 4:
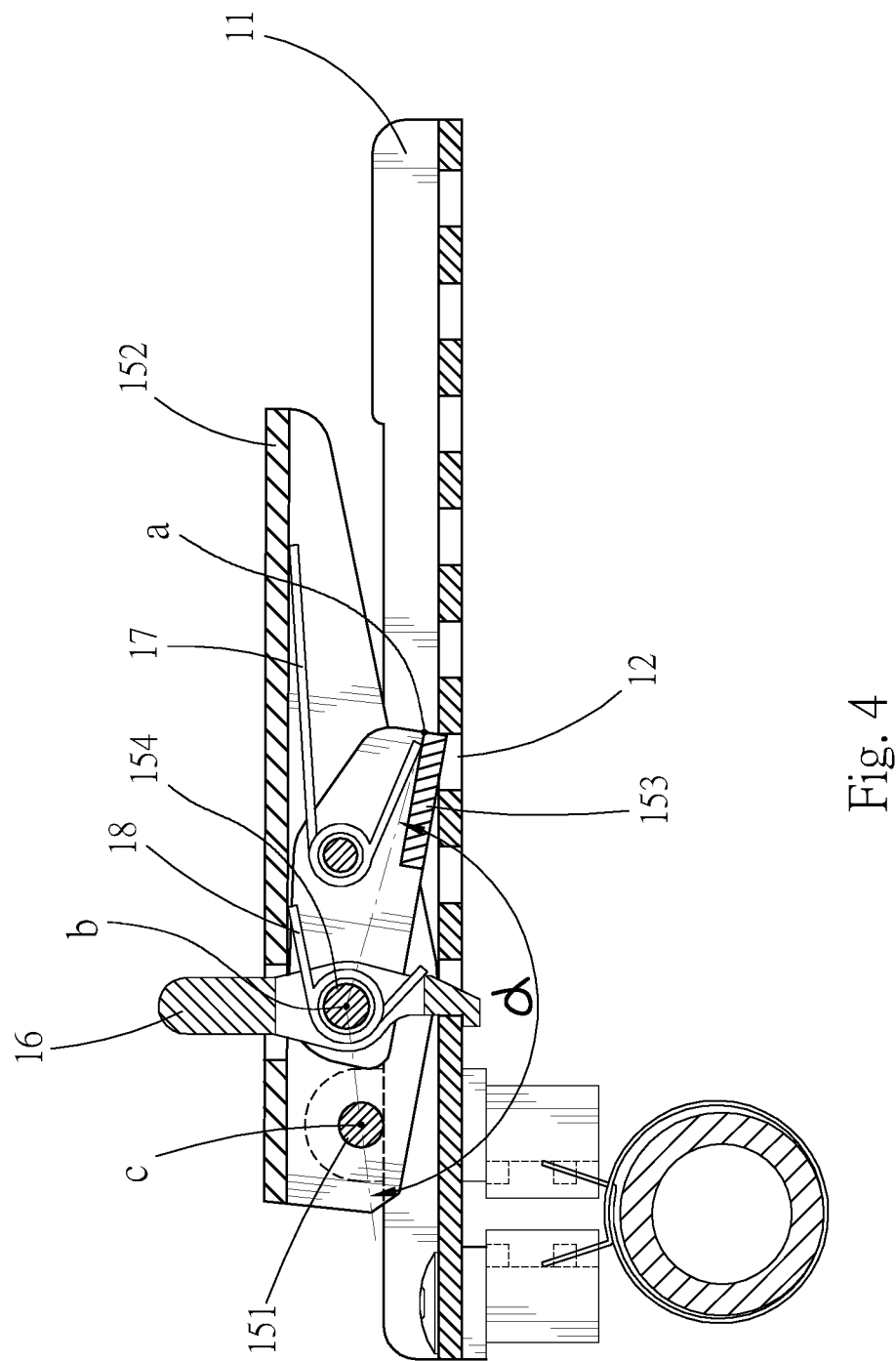
FIG. 4 is a cross-sectional diagram along the section line A-A in FIG. 1 according to a preferred embodiment of the present creation, where the angle is of a second value.

Further, when a user applies a force on the pulling portion (152), the pulling portion (152) rotates about the connecting portion (151) toward the base (11), and the angle (α) is enlarged from the first value to a second value, as shown in FIG. 4. In this case, one end of the long axis of the retaining member (16) synchronously penetrates through the corresponding positioning portion (12) and is engaged thereto, so that the angle (α) is set at the second value, and the pipe clamp (20) is expanded synchronously for dismounting or mounting.

Figure 5:
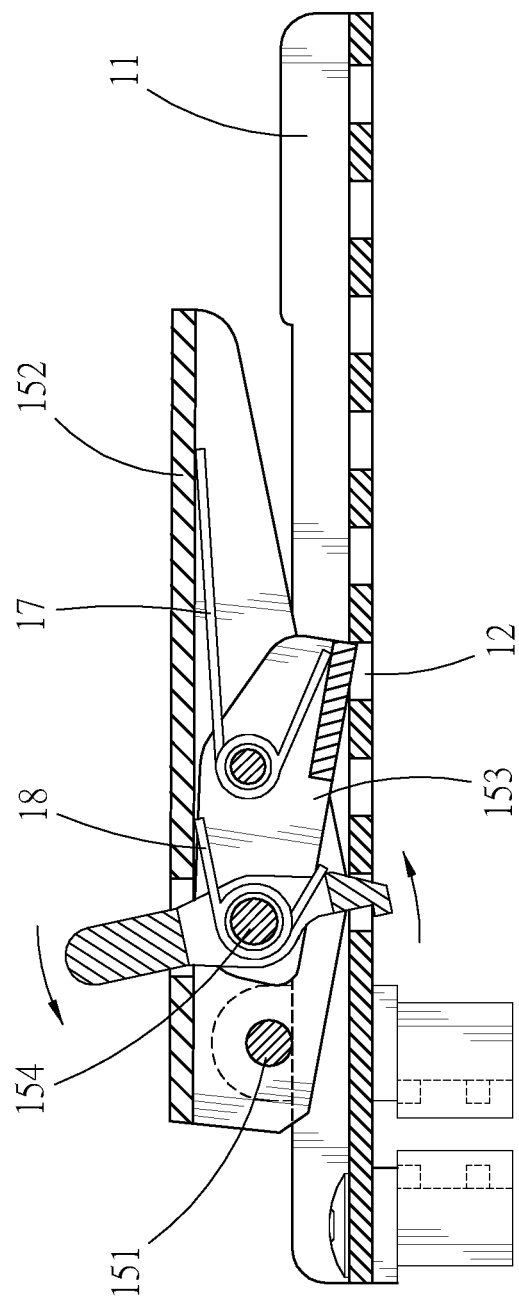
FIG. 5 and FIG. 6 are cross-sectional diagrams showing the operating state of a retaining member and taken along the section line A-A in FIG. 1 according to a preferred embodiment of the present creation.
Figure 6:
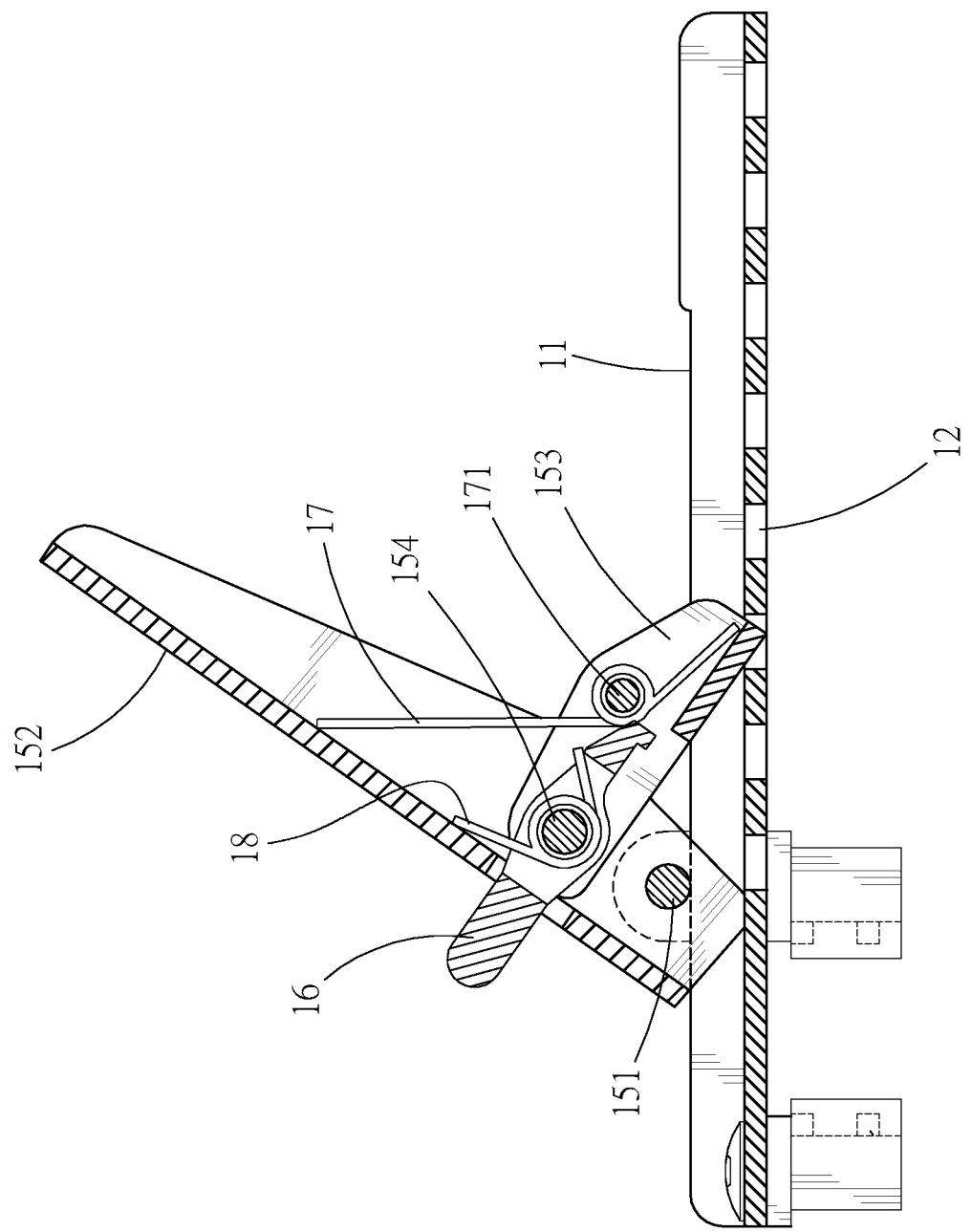

Afterward, as shown in FIG. 5, a user applies a force to pull the retaining member (16) to release the retaining member (16) and the corresponding positioning portion (12) from the engaged state. Therefore, as shown in FIG. 6, the pulling portion (152) is restored under the elastic force of the first elastic element (17) and the angle (α) is of the first value.

LIST OF REFERENCE NUMERALS

(10) tool for mounting and dismounting a pipe clamp, (11) base, (111) base plate, (112) side plate, (113) guide portion, (114) stop shoulder surface, (115) joining hole, (12) positioning portion, (13) first end portion, (131) first end block, (132) first joining bolt, (14) second end portion, (141) slide body, (142) through hole, (143) second end block, (144) second joining bolt, (15) operating member, (151) connecting portion, (152) pulling portion, (1521) side body, (153) supporting portion, (154) shaft bolt, (155) via hole, (16) retaining member, (161) one end of the long axis, (162) the other end of the long axis, (17) first elastic element, (18) second elastic element, (a) abutment part of the supporting portion and the base, (b) pivotal connection part of the supporting portion and the pulling portion, (c) connection part of the connecting portion and the second end portion, (α) angle.

What is claimed is:
1. A tool for mounting and dismounting a pipe clamp, comprising:
  a base, having a linearly extending guide portion;
  a first end portion, disposed on the base;
  a second end portion, disposed on the base, and capable of being guided by the guide portion to make linear reciprocating displacement on the base, so as to be close to or away from the first end portion;
  an operating member, for driving the second end portion to make linear reciprocating displacement on the base;
  a first elastic element, disposed between the supporting portion and the pulling portion, to elastically maintain a first value of the angle;
  a retaining member, disposed on the pulling portion and engaged on the base, so that the angle reaches a second value greater than the first value;
  a second elastic element disposed between the retaining member and the pulling portion, wherein when the retaining member is engaged on the base, the second elastic element provides an elastic force to maintain the engagement between the retaining member and the base;

wherein the operating member has a connecting portion connected to the second end portion, a pulling portion having one end connected to the connecting portion, and a supporting portion having one end pivotally connected to the pulling portion and the other end abutting against the base so as to be positioned; thereby, an angle is formed by the abutment part of the other end of the supporting portion and the base, the pivotal connection part of the supporting portion and the pulling portion, and the connection part of the connecting portion and the second end portion; an external force is applied to rotate the pulling portion to change the value of the angle, so that the second end portion is driven by the connecting portion to make reciprocating displacement on the base;

wherein a central part of the retaining member is pivotally connected to the pulling portion, one end of the retaining member is located between the pulling portion and the base, and when the pulling portion rotates and the value of the angle is changed to the second value, one end of the retaining member is engaged with the base.

2. The tool for mounting and dismounting a pipe clamp according to claim 1, further comprising a plurality of positioning portions, which are sequentially and separately disposed on the base along an extension straight line of the guide portion, and are used for positioning the other end of the supporting portion.

3. The tool for mounting and dismounting a pipe clamp according to claim 2, wherein the positioning portions are holes, in which the other end of the supporting portion is capable of being inserted.

4. The tool for mounting and dismounting a pipe clamp according to claim 1, further comprising a plurality of hole-shaped positioning portions, which are sequentially and separately disposed on the base along an extension straight line of the guide portion, and to which one end of the retaining member is capable of being engaged.

5. The tool for mounting and dismounting a pipe clamp according to claim 4, further comprising a second elastic element disposed between the retaining member and the pulling portion, wherein when the retaining member is engaged on the base, the second elastic element provides an elastic force to maintain the engagement between the retaining member and the base.

6. The tool for mounting and dismounting a pipe clamp according to claim 5, wherein the other end of the retaining member is externally located on one side of the pulling portion away from the base.

7. The tool for mounting and dismounting a pipe clamp according to claim 6, wherein the operating member further comprises a via hole, which penetrates through the pulling portion, and from which the other end of the retaining member protrudes.

8. The tool for mounting and dismounting a pipe clamp according to claim 1, wherein the other end of the retaining member is externally located on one side of the pulling portion away from the base.

9. The tool for mounting and dismounting a pipe clamp according to claim 8, wherein the operating member further comprises a via hole, which penetrates through the pulling portion, and from which the other end of the retaining member protrudes.

* * * * *